US011255131B2

(12) United States Patent
Stair et al.

(10) Patent No.: US 11,255,131 B2
(45) Date of Patent: Feb. 22, 2022

(54) HIGH OPENING PRESSURE POPPET VALVE

(71) Applicant: HALLIBURTON ENERGY SERVICES INC., Houston, TX (US)

(72) Inventors: Todd Anthony Stair, Spring, TX (US); Carlos Alejandro Valdez, Humble, TX (US); Saul Emmanuel Vazquez, Humble, TX (US); Michael Malave, Humble, TX (US); Christopher James Mericas, Houston, TX (US); Lonnie Carl Helms, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 32 days.

(21) Appl. No.: 16/193,857

(22) PCT Filed: Aug. 31, 2016

(86) PCT No.: PCT/US2016/049733
§ 371 (c)(1),
(2) Date: Nov. 16, 2018

(87) PCT Pub. No.: WO2018/044299
PCT Pub. Date: Mar. 8, 2018

(65) Prior Publication Data
US 2019/0264512 A1    Aug. 29, 2019

(51) Int. Cl.
E21B 17/00    (2006.01)
E21B 34/06    (2006.01)
(Continued)

(52) U.S. Cl.
CPC ............ E21B 17/006 (2013.01); E21B 21/10 (2013.01); E21B 34/06 (2013.01); F16K 15/063 (2013.01)

(58) Field of Classification Search
CPC .......... E21B 17/006; E21B 21/10; E21B 34/06
See application file for complete search history.

(56) References Cited

U.S. PATENT DOCUMENTS 3,967,679 A     7/1976    Liljestrand
4,067,358 A *   1/1978    Streich .................... E21B 21/10
                                                    137/515
(Continued)

OTHER PUBLICATIONS

International Search Report and Written Opinion; PCT Application No. PCT/US2016/049733; dated May 10, 2017.
(Continued)

Primary Examiner — Christopher J Sebesta
Assistant Examiner — Neel Girish Patel
(74) Attorney, Agent, or Firm — Polsinelli PC

(57) ABSTRACT

A poppet valve having an elongated tubular housing and an internal bore. A flange extends within the internal bore supporting an interior tubular member. The interior tubular member itself has a central aperture and an inwardly protruding lip extending into the central aperture. A stem having collet fingers may be partially received in the central aperture of the interior tubular member. The collet fingers have a protrusion which is engagable with the inwardly protruding lip. A biasing element is provided biasing the stem toward a first position. An elastomeric seal may be disposed around the stem. When the stem is in a first position the elastomeric seal forms a fluid tight seal preventing fluid flow through the internal bore, and wherein upon application of a predetermined fluid pressure the stem transitions from the first position to a second position, whereby fluid flow is permitted through the internal bore.

22 Claims, 9 Drawing Sheets

(51) Int. Cl.
*F16K 15/06* (2006.01)
*E21B 21/10* (2006.01)

(56) References Cited

U.S. PATENT DOCUMENTS

| | | | | |
|---|---|---|---|---|
| 4,615,394 | A | | 10/1986 | Kuhlman, Jr. |
| 4,625,755 | A | * | 12/1986 | Reddoch ............... E21B 21/106 |
| | | | | 137/327 |
| 4,708,163 | A | * | 11/1987 | Deaton ................. E21B 34/066 |
| | | | | 137/460 |
| 4,712,619 | A | * | 12/1987 | Stepp .................... F16K 15/063 |
| | | | | 166/327 |
| 4,944,351 | A | | 7/1990 | Eriksen et al. |
| 4,955,949 | A | | 9/1990 | Bailey et al. |
| 5,165,493 | A | | 11/1992 | Baugh |
| 5,909,771 | A | * | 6/1999 | Giroux ................. E21B 21/106 |
| | | | | 166/120 |
| 6,053,191 | A | | 4/2000 | Hussey |
| 6,460,620 | B1 | | 10/2002 | Lafleur |
| 6,802,374 | B2 | | 10/2004 | Edgar et al. |
| 7,322,413 | B2 | | 1/2008 | Rogers et al. |
| 8,069,926 | B2 | * | 12/2011 | Eddison ................. E21B 34/06 |
| | | | | 166/386 |
| 2006/0225885 | A1 | * | 10/2006 | Mcgarian ............. E21B 23/006 |
| | | | | 166/334.4 |
| 2009/0008102 | A1 | * | 1/2009 | Anderson ............... E21B 34/10 |
| | | | | 166/373 |
| 2011/0209881 | A1 | * | 9/2011 | Hriscu .................... E21B 17/04 |
| | | | | 166/387 |
| 2014/0110129 | A1 | * | 4/2014 | Schmidt ................. E21B 23/04 |
| | | | | 166/377 |
| 2014/0182855 | A1 | * | 7/2014 | Woodford ............... E21B 34/10 |
| | | | | 166/305.1 |
| 2014/0262299 | A1 | * | 9/2014 | Tinnen .................... E21B 27/00 |
| | | | | 166/311 |
| 2015/0204162 | A1 | * | 7/2015 | Gay ....................... E21B 21/103 |
| | | | | 166/373 |
| 2015/0308250 | A1 | * | 10/2015 | Anders ................. E21B 43/164 |
| | | | | 166/308.2 |
| 2019/0120013 | A1 | * | 4/2019 | Gay ........................ E21B 34/08 |

OTHER PUBLICATIONS

Examination Report, Australian Application No. 2016422165, dated May 26, 2021.

* cited by examiner

HIGH OPENING PRESSURE POPPET VALVE

CROSS-REFERENCE TO RELATED APPLICATIONS

This application is a national stage entry of PCT/US2016/049733 filed Aug. 31, 2016, said application is expressly incorporated herein in its entirety.

FIELD

The present disclosure relates generally to a valve. In particular, the subject matter herein generally relates to a valve for use in a high pressure environment.

BACKGROUND

Wellbores are drilled into the earth for a variety of purposes including extracting oil and gas from an earth formation for use as fuel, lubricants, chemical production, and other purposes. After drilling is completed, the well is cased; the casing is a pipe that extends down the wellbore, through which the oil and gas is to be extracted. Casing is done for a variety of reasons, including supporting the wellbore to prevent the surrounding earth formation from collapsing and isolation of certain earth formations. During this process, a casing string is run down the wellbore and a cement slurry is pumped out of the casing and into the annulus surrounding the casing string. The cement slurry replaces the natural wellbore fluid and hardens to secure the casing into place. However, during the process, cement, or other fluid, can be expelled and lost to the surrounding environment.

In order to prevent the loss of fluid, a float shoe containing a valve can be disposed at the terminal end of the casing string. The valve can also be used as a backpressure valve to keep unwanted fluids from flowing back up through the casing string. Valves typically used can include check valves, float valves, and poppet valves; such valves can include a solid central piston and allow for fluid flow through an axial throughbore. The pistons can be biased upwardly within the valve housing by a spring or rubber cylinder. While the spring or rubber cylinder prevents the loss of large amounts of drilling fluid, these biasing elements require very little force, for example 19-25 lbf, to achieve the open pressure, for example 6 to 10 psi, allowing leakage to occur. Some high pressure valves are available, many of which use springs to hold the piston into place. However, as force increases the springs compress, causing the valves to leak.

BRIEF DESCRIPTION OF THE DRAWINGS

Implementations of the present technology will now be described, by way of example only, with reference to the attached figures, wherein.

DETAILED DESCRIPTION

Figure 1:
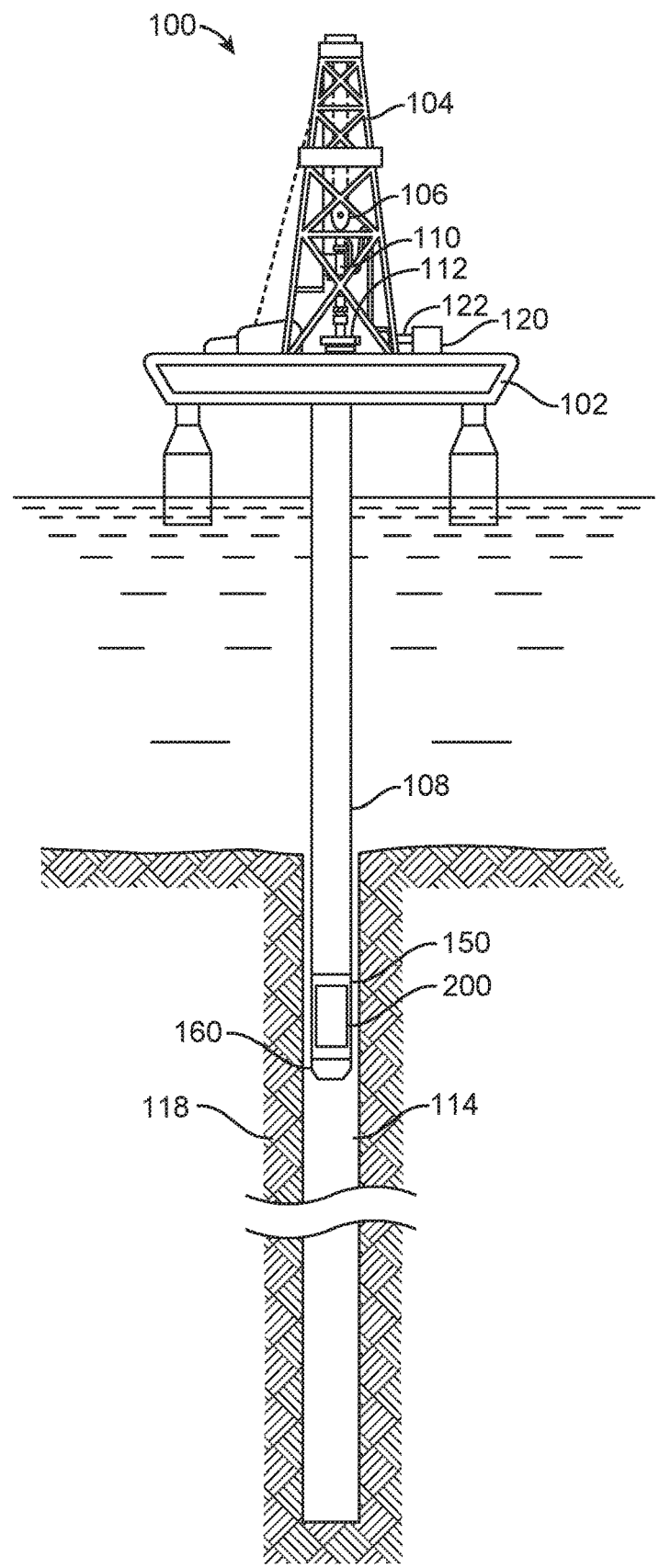
FIG. 1 is a diagram illustrating an exemplary environment for a poppet valve according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, reference to up or down is made for purposes of description with "up," "upper," "upward," or "uphole" meaning toward the surface of the wellbore and with "down," "lower," "downward," or "downhole" meaning toward the terminal end of the well, regardless of the wellbore orientation. Correspondingly, the transverse, axial, lateral, longitudinal, radial, etc., orientations shall mean orientations relative to the orientation of the wellbore or tool.

Several definitions that apply throughout the above disclosure will now be presented. The term "coupled" is defined as connected, whether directly or indirectly through intervening components, and is not necessarily limited to physical connections. The connection can be such that the objects are permanently connected or releasably connected. The term "inside," "inner," or "internal" refers to a region that is within the outermost confines of a physical object. The terms "comprising," "including" and "having" are used interchangeably in this disclosure. The terms "comprising," "including" and "having" mean to include, but not necessarily be limited to the things so described.

Disclosed herein is a poppet valve for use in a wellbore after the drilling operations for casing a section of the wellbore. The poppet valve can be disposed within a cylindrical steel body, or float shoe, coupled with the terminal end of a casing run into the wellbore. The poppet valve can include an elongated tubular housing disposed around a stem. The elongated tubular housing can include at least one flange extending inward and supporting an interior tubular member forming a central aperture therein. The stem can be at least partially received in the central aperture such that one or more collet fingers are coupled with the interior tubular member and held in a sealed configuration by opposing ramped protrusions and a biasing element.

The poppet valve can transition from a sealed configuration to an open configuration when a predetermined force is exerted onto the uphole end of the stem to reach the desired opening pressure. As the force reaches the predetermined level, the one or more collet fingers elastically deform allowing the opposing ramped protrusions to pass each other and compress the biasing element. As long as the pressure is maintained the valve remains in the open configuration. Once the pressure drops below a certain level, the biasing element expands and the opposing ramped protrusions are returned to their original state, resealing the valve.

Typical valves used during the casing and cementing process can require very little pressure to open, which can lead to leakage of fluid as the pressure within the casing increases. For example, as the casing descends towards the terminal end of the wellbore, pressure within the casing increases. The above described poppet valve arrangement allows for more control over the opening pressure of the valve. Additionally, due to the interaction between the opposing ramped protrusions, substantially no fluid can leak through the seal prior to reaching the desired opening pressure.

The poppet valve, as described above, can be disposed within a casing used in an exemplary wellbore system 100 as shown, for example, in FIG. 1. As depicted in FIG. 1, a drilling platform 102 is equipped with a derrick 104 that supports a hoist 106 for raising and lowering a casing 108. While FIG. 1 generally depicts a wellbore system 100 including a casing 108, it would be apparent to those of skill in the art that the described system can be used with any type of downhole tubular, including, but not limited to drill strings, production tubing, work strings, or the like. The hoist 106 suspends a top drive 110, or other casing running apparatus, suitable for running the casing 108 through the well head 112 and into a wellbore 114 drilled into earth formation 118. A float shoe 150, or guide shoe, can be disposed at the terminal end of the casing 108 along with a bull nose 160. The float shoe 150 can be coupled with the casing 108 via a material, such as cement, resin, or other similar media, or a mechanical connection, such as a threaded connection. For example, the steel case can have a box casing threaded to the top and a casing pin thread to the bottom. The bull nose 160 allows the casing to enter the wellbore 114 and descend without catching. Additionally, a poppet valve 200 can be disposed within the float shoe 150 in order to prevent fluid from within the casing 108 from being lost to the surrounding environment.

A pump 120 can be coupled with the casing 108 and can circulate fluid through a supply pipe 122 to top drive 110, through the interior of casing 108 and expel fluid through poppet valve 200. The fluid can then be circulated back to the surface via the annulus around the casing 108, and into a retention pit. A variety of fluids can be pumped through the wellbore system 100 described above, including, but not limited to, cementing fluid, drilling fluid, and wellbore fluid.

Furthermore, poppet valve 200 can function as a back-pressure valve, preventing unwanted fluids, such as sea water, from entering the casing while the casing string is being lowed into the wellbore.

It should be noted that while FIG. 1 generally depicts a sea-based operation, those skilled in the art would readily recognize that the principles described herein are equally applicable to operations that employ land-based platforms and rigs, without departing from the scope of the disclosure. Also, even though FIG. 1 depicts a vertical wellbore, the present disclosure is equally well-suited for use in wellbores having other orientations, including horizontal wellbores, slanted wellbores, multilateral wellbores or the like.

Figure 2:
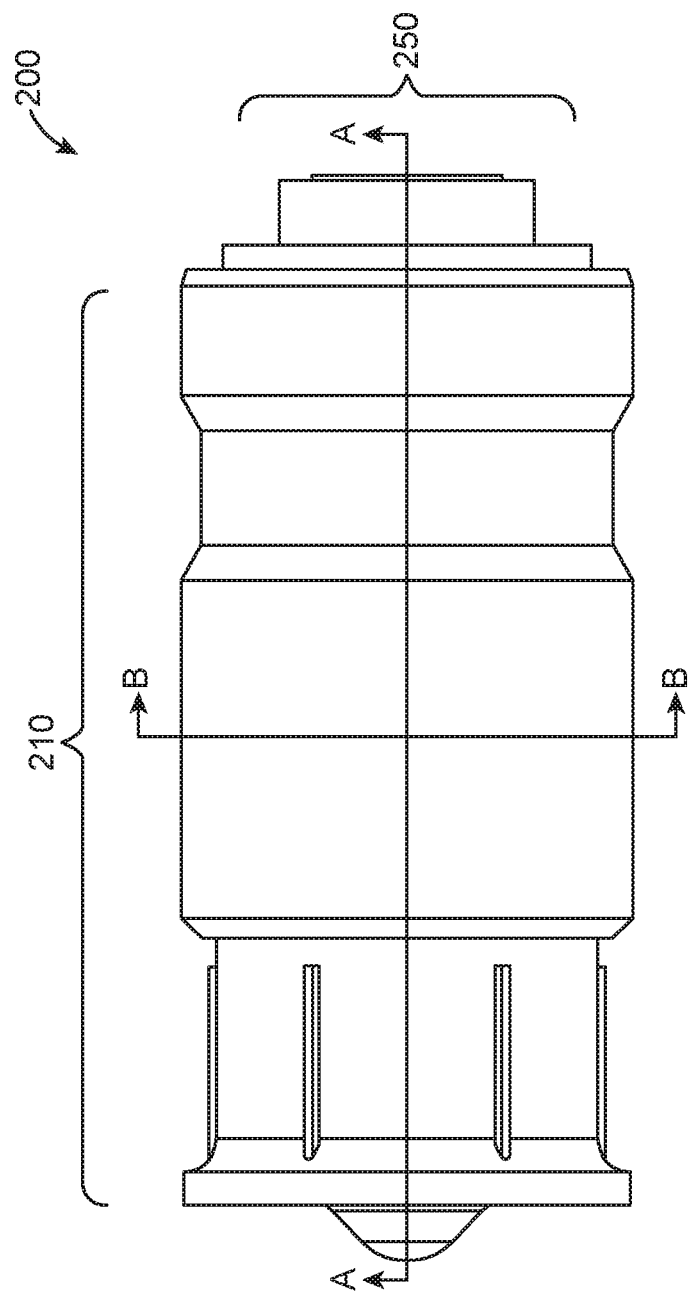
FIG. 2 is a diagram illustrating an exemplary poppet valve according to the present disclosure.
Figure 3A:
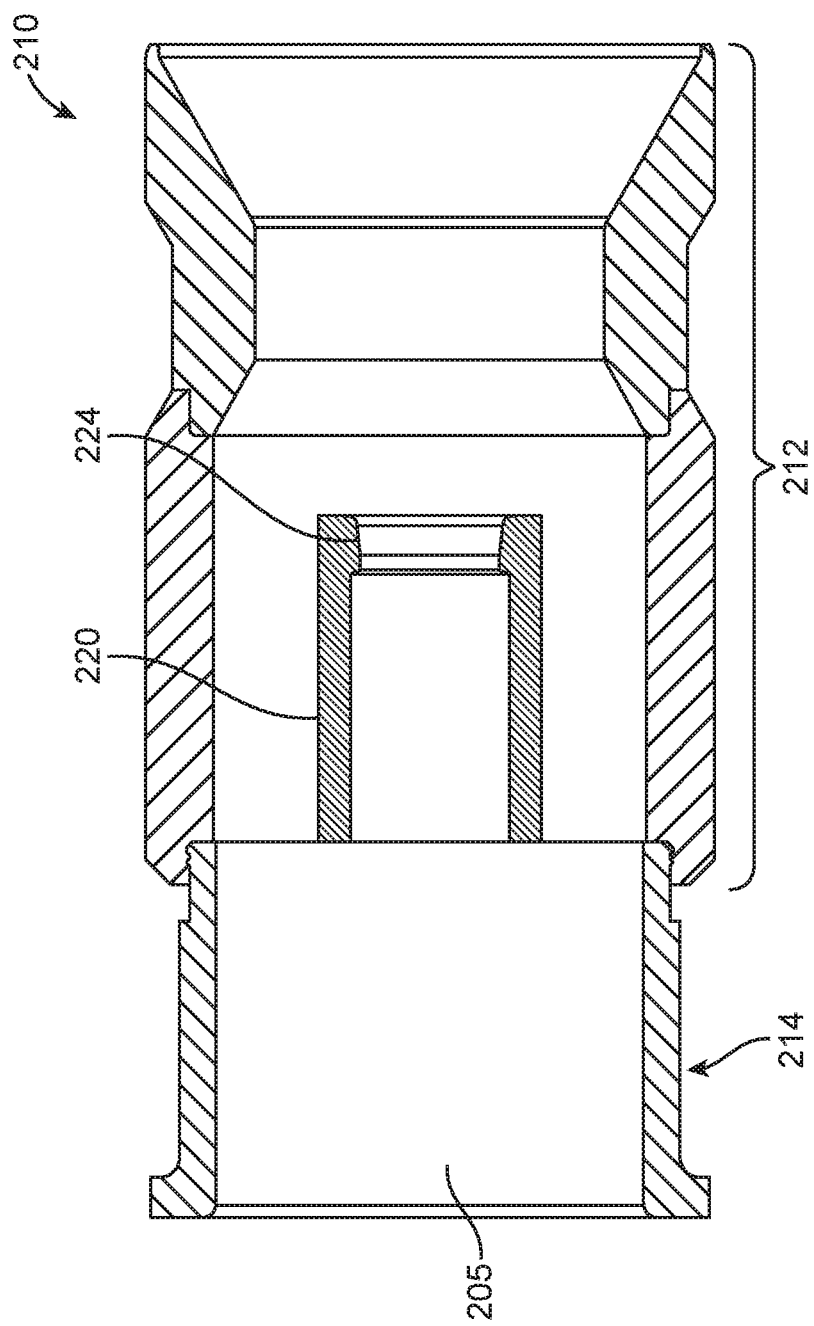
FIG. 3A is a cross sectional diagram of the housing of the poppet valve taken along the longitudinal axis A-A, according to the disclosure herein.
Figure 3B:
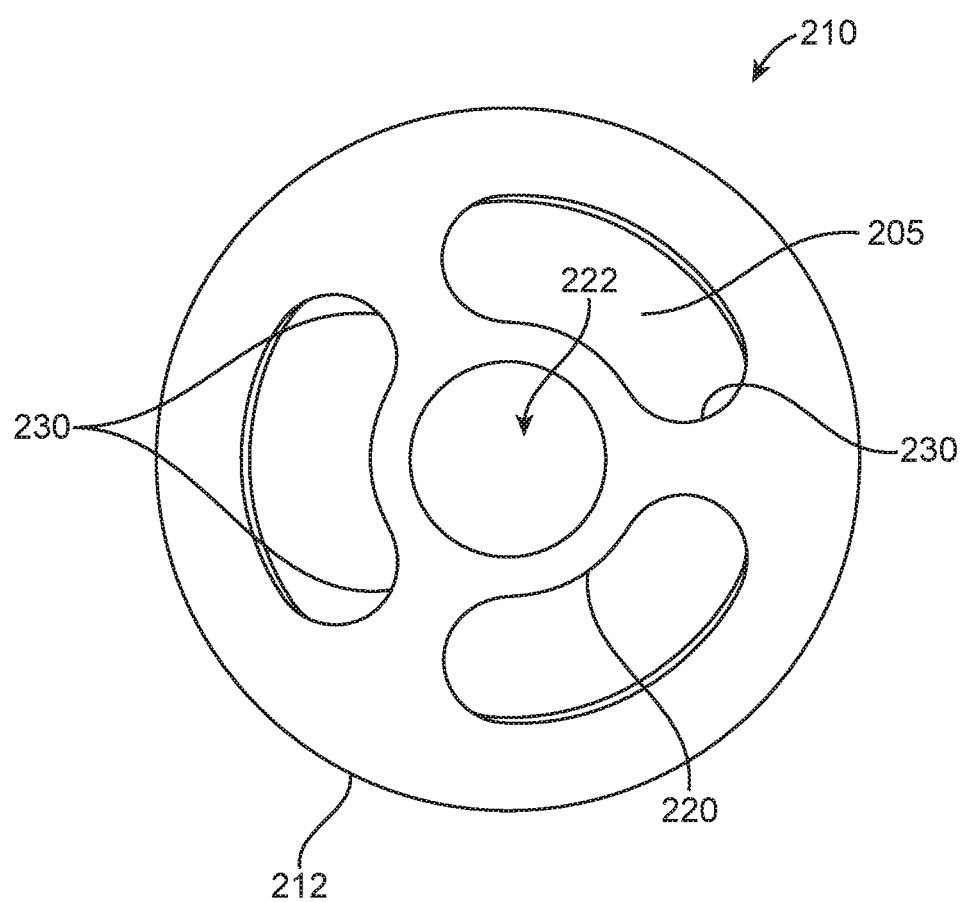
FIG. 3B is a cross sectional diagram of the housing of the poppet valve taken along the lateral axis B-B, according to the disclosure herein.

FIG. 2 depicts an exemplary poppet valve 200 that can be coupled with a float shoe 150 (see FIG. 1) and used in the operating environment described above. The poppet valve 200 can include an elongated tubular housing 210 and a stem 250 disposed within the elongated tubular housing 210, the poppet valve 200 having a longitudinal axis A-A, and a lateral axis B-B. A cross sectional view of the elongated tubular housing 210 taken along longitudinal axis A-A, is shown in FIG. 3A. The elongated tubular housing 210 can be formed from one or more components, including, for example, an upper body 214 coupled with a lower body 212, forming an internal bore 205 therethrough. Although FIG. 2 depicts the elongated tubular housing 210 as having two components, it would be apparent to those of skill in the art that any number of components could be used. The elongated tubular housing 210 can further include an interior tubular member 220 supported by at least one flange 230 (as shown in FIG. 3B), extending longitudinally along a length of the elongated tubular housing 210, and having an inwardly protruding lip 224. A cross sectional view of the elongated tubular housing 210 taken along the lateral axis B-B, is shown in FIG. 3B. The interior tubular member 220 can create a central aperture 222 running longitudinally through the elongated tubular housing 210 and allowing for fluid flow.

Figure 4:
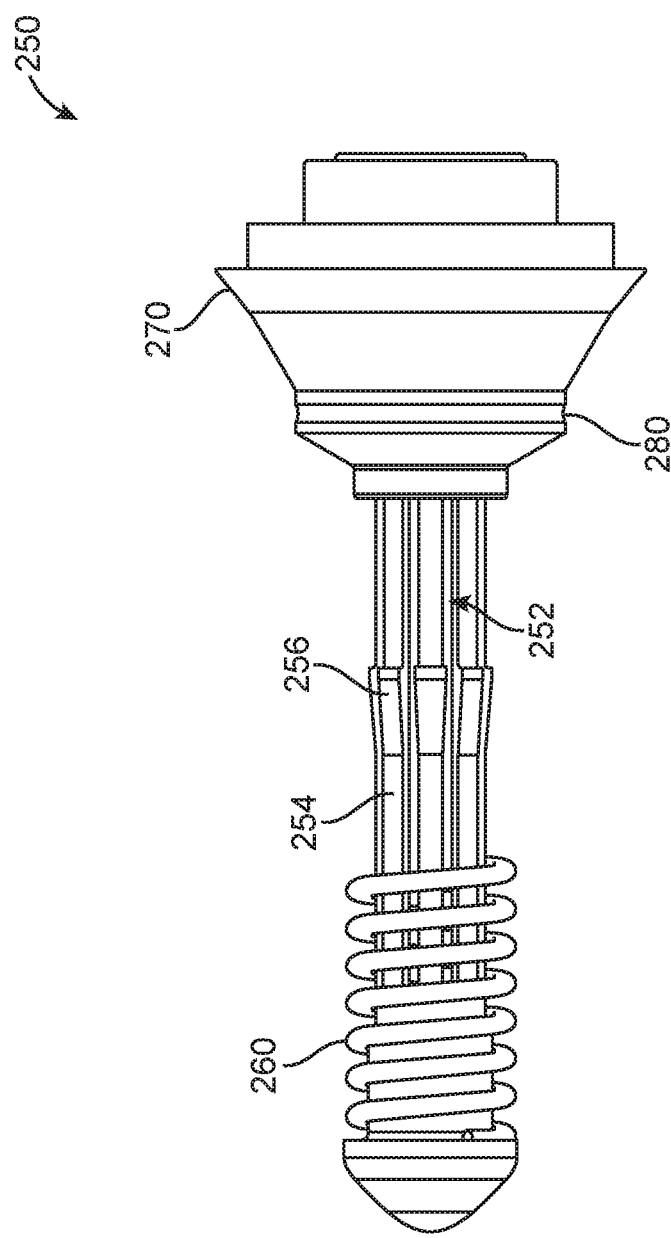
FIG. 4 is a diagram illustrating a collet stem of the poppet valve according to the disclosure herein.

FIG. 4 depicts an exemplary stem 250 that can be used in poppet valve 200. The stem 250 can include a plurality longitudinally elongated collet apertures 252 separating one or more collet fingers 254, and at least one protrusion 256 extending from the one or more collet fingers 254 of the stem 250. While FIG. 4 generally depicts a stem with eight collet fingers, it would be obvious to those of skill in the art that any number of collet fingers could be used. Additionally, the number of collet fingers can be adjusted in order to increase or decrease the desired opening pressure. The stem 250 can further include an elastomeric seal 270 disposed at the downhole end of the stem 250 and creating a substantially fluid tight seal between the stem 250 and the elongated tubular housing 210 (shown in FIG. 5). The stem 250 can additionally include an O-ring 280 to further improve the fluid seal. A biasing element 260 can be disposed around the uphole end of the stem 250. While FIG. 4 generally depicts the biasing element 260 as a coil spring, it would be apparent to those skilled in the art that any suitable spring or biasing element could be used.

Figure 5:
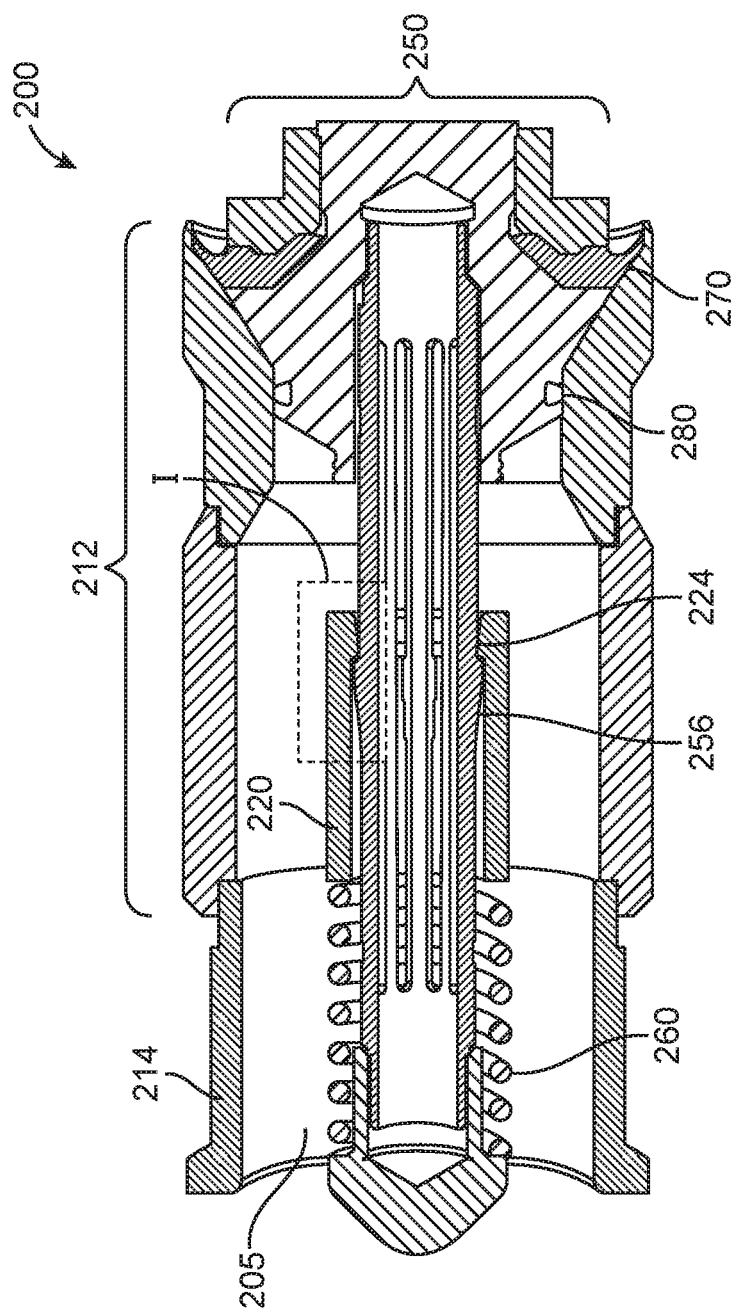
FIG. 5 is a cross sectional diagram of the poppet valve, taken along the longitudinal axis A-A, in a sealed configuration according to the disclosure herein.

A cross sectional view of the poppet valve 200 in a sealed configuration is shown in FIG. 5, showing the stem 250 disposed within the central aperture 222 (see FIG. 3B) of the elongated tubular housing 210. In the sealed configuration, the elastomeric seal 270 and the O-ring 280 rest on the inside surface of the lower body 212 of the elongated tubular housing 210. The stem 250 is held in place by opposing ramped protrusions and a biasing element 260, the at least one protrusion 256 rests against the inwardly protruding lip 224 of the interior tubular member 220 and the biasing element 260 rests between the uphole end of the interior tubular member 220 and the uphole end of the stem 250. In this configuration, fluid from the drilling rig can flow through the upper body 214, into the internal bore 205, and surround the stem 250, but cannot pass the O-ring 280 and elastomeric seal 270.

Figure 6:
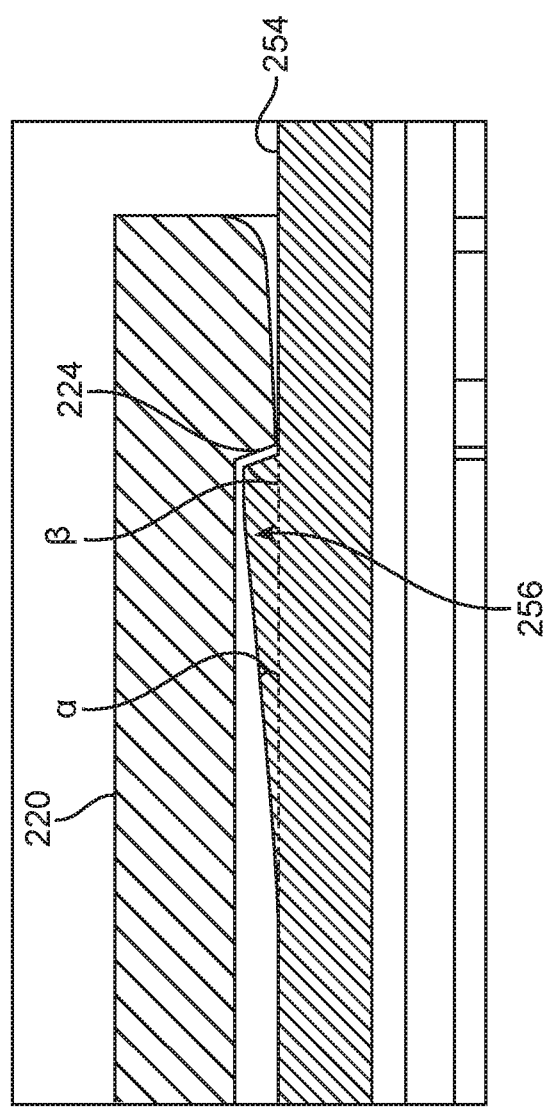
FIG. 6 is an enlarged view of box I of FIG. 5.

FIG. 6 illustrates an enlarged view of box I of FIG. 5, showing the interaction between the at least one protrusion 256 and the inwardly protruding lip 224 in the sealed configuration. The at least one protrusion 256 can be a ramped protrusion having a first sloped surface and a second sloped surface, the first sloped surface having an angle $\alpha$ and the second sloped surface having an angle $\beta$. In the sealed configuration, the angle $\alpha$ does not engage any other surface, and the angle $\beta$ abuts the inwardly protruding lip 224. As angle β increases, the pressure required to transition the valve from a sealed configuration to an open configuration also increases; as such, the exact degree of angle β can be selected based on the desired opening pressure. For example, in at least one embodiment, angle β can be from about zero degrees (0°) to about ninety degrees (90°); in an alternatively, angle β can be from about forty-five degrees (45°) to about ninety degrees (90°).

To transition the poppet valve 200 to the open configuration, the one or more collet fingers 254 are elastically deformed inward such that the at least one protrusion 256 passes the inwardly protruding lip 224. The amount of force required to transition can additionally be based in part on the material the stem is formed from as well as the number, width, and thickness of the collet fingers. The diameter of the stem itself can also be adjusted in order to achieve the desired opening and sealing pressures. The stem material can be, but is not limited to, aluminum, steel, brass, composite, any other suitable material and alloys thereof. The material can be selected based on the intended use for the valve, for example, materials that can withstand extreme temperatures can be used. In order to prevent the one or more collet fingers 254 from permanently deforming, the force to be applied must be less than the yield stress of the stem material. For example, the opening pressure can be at least 50 psi, alternatively, the opening pressure may be at least 80 psi to about 120 psi. The fluid pressure may exert a force to open the valve, and the force may be at least 100 lbf. Alternatively the force may range from 100 lbf to 2,000 lbf, alternatively the force may range from 200 to 1,500 lbf. The force required to achieve the opening pressure can also be determined, at least in part, from the surface area of the stem 250 on which the force will be exerted.

Figure 7:
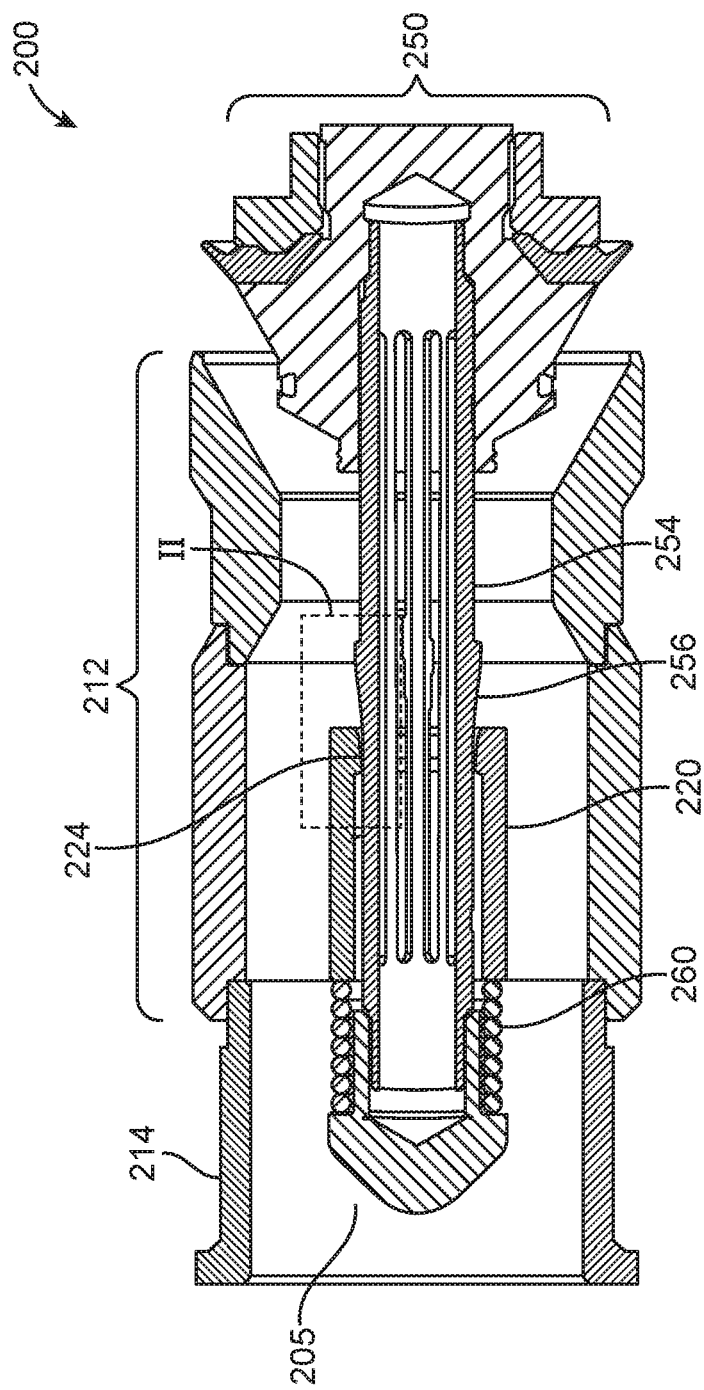
FIG. 7 is a cross sectional diagram of the poppet valve in an open configuration according to the disclosure herein.

FIG. 7 shows a cross sectional view of the poppet valve 200 in an open configuration. In this configuration, the stem 250 is longitudinally displaced such that the at least one protrusion 256 has moved past the inwardly protruding lip 224 and the biasing element 260 is compressed, allowing fluid to flow through the internal bore 205 of the elongated tubular housing 210. The force on the uphole end of the stem 250 is sufficient to keep the biasing element 260 compressed. Due to the design of the poppet valve 200 as described above, the circulation pressure within the poppet valve 200 does not increase when the stem 250 is in the open configuration.

Figure 8:
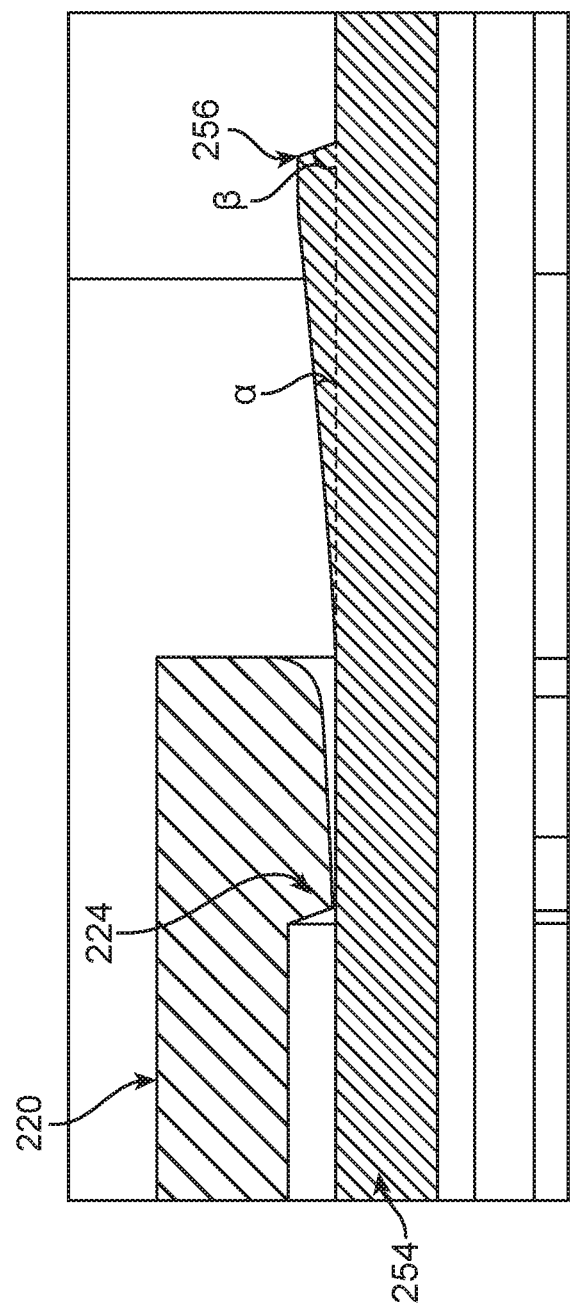
FIG. 8 is an enlarged view of box II of FIG. 7.

FIG. 8 shows an enlarged view of box II showing the inwardly protruding lip 224 and the at least one protrusion 256 as arranged in the open configuration. Angle α is such that the force of the biasing element 260 can return the stem 250 to the sealed configuration. The angle α can be adjusted based on the upward force exerted by the selected biasing element 260. As angle α increases, the force required to return the poppet valve 200 to the sealed position also increases. For example, the angle α can be from about zero degrees (0°) to about ninety degrees (90°); alternatively, angle α can be from about zero degrees (0°) to about forty-five degrees (45°).

While FIGS. 4-8 generally depict a poppet valve 200 having an angle α smaller than angle β, it would be readily apparent to those of skill in the art that angle α and angle β can be any combination of the disclosed ranges. For example, angle β may be larger than angle α. Alternatively, angle α may be the same as angle β, as long as α and β are not both about zero degrees (i.e. α=β≠0) or about ninety degrees (i.e. α=β≠90).

The following example is provided to illustrate the subject matter of the present application. The example is not intended to limit the scope of the present disclosure and should not be so interpreted. The data presented in the following example is provided for the purpose of demonstration. If a material used in the stem 250 as described above has a modulus of elasticity of 10,000,000 psi and the desired opening pressure is 120 psi, the downward force (fluid pressure) required to open the valve would be 1,200 lbf, at an angle β of seventy-five degrees (75°). Additionally, for the same poppet valve 200 with a biasing element 260 able to exert 28 lb of biasing force, or upward force, on the stem 250, angle α would need to be about five degrees (5°) to return the stem 250 to the sealed configuration. It should be noted that this is merely provided as an example and that the opening pressure can be set to any number, as long as the force would not plastically deform the material used in the stem.

Numerous examples are provided herein to enhance understanding of the present disclosure. A specific set of statements are provided as follows.

Statement 1: A poppet valve comprising an elongated tubular housing having an internal bore extending along a longitudinal axis of the elongated tubular housing and having at least one flange extending into the internal bore, the at least one flange supporting an interior tubular member extending along a length of the longitudinal axis within the elongated tubular housing and having a central aperture, fluid communication being permitted through the internal bore between the elongated tubular housing and the interior tubular member, the interior tubular member having an inward protruding lip extending from an inner surface of the interior tubular member into the central aperture; a stem at least partially received in the central aperture of the interior tubular member, a middle portion of the stem having one or more collet fingers, the stem being slidably transitionable between a first position and a second position; at least one protrusion extending from the one or more collet fingers, the at least one protrusion engagable with the inward protruding lip; a biasing element disposed in the elongated tubular housing and engageable with the stem and biasing the stem toward the first position; and an elastomeric seal disposed around a first end of the stem; wherein when the stem is in the first position the at least one protrusion is engaged with the inward protruding lip and the elastomeric seal forms a substantially fluid tight seal within the elongated tubular housing preventing fluid flow through the internal bore; wherein upon application of a predetermined fluid pressure through the elongated tubular housing, the stem transitions from the first position to the second position, overcoming the biasing force of the biasing element and being longitudinally displaced such that the at least one protrusion passes over the inward protruding lip, whereby fluid flow is permitted though the internal bore.

Statement 2: A poppet valve according to Statement 1, further comprising an O-ring disposed around the first end of the stem and engaging an inner surface of the elongated tubular housing.

Statement 3: A poppet valve according to Statement 1 or Statement 2, wherein the at least one protrusion has a first sloped surface and a second sloped surface, the first sloped surface having a first angle of inclination shallow enough to allow the biasing element to return the stem to the first position upon removal of fluid pressure and the second sloped surface having a second angle of inclination abutting the inward protruding lip of the elongated tubular housing.

Statement 4: A poppet valve according to Statements 1-3, wherein the first angle of inclination is from about zero degrees (0°) to about ninety degrees (90°) relative to the longitudinal axis, and the second angle of inclination is from about zero degrees (0°) to about ninety degrees (90°) relative to the longitudinal axis.

Statement 5: A poppet valve according to Statements 1-4, wherein the first angle of inclination is from about zero degrees (0°) to about forty-five degrees (45°) relative to the longitudinal axis, and the second angle of inclination is from about forty-five degrees (45°) to about ninety degrees (90°) relative to the longitudinal axis.

Statement 6: A poppet valve according to Statements 1-5, wherein the first angle of inclination and the second angle of inclination are not both zero degrees (0°).

Statement 7: A poppet valve according to Statements 1-6, wherein the first angle of inclination and the second angle of inclination are not both ninety degrees (90°).

Statement 8: A poppet valve according to Statements 1-7, wherein the first angle of inclination is at least five degrees (5°) relative to the longitudinal axis.

Statement 9: A poppet valve according to Statements 1-8, wherein the second angle of inclination is at least seventy five degrees (75°) relative to the longitudinal axis.

Statement 10: A poppet valve according to Statements 1-9, wherein the biasing element exerts a force of at least 20 pounds on the interior tubular member, thus fluid pressure of at least 20 pounds holds the stem in the second position and fluid pressure less than 20 pounds transitions the stem from the second position to the first position.

Statement 11: A poppet valve according to Statements 1-10, wherein the biasing element is a coil spring.

Statement 12: A poppet valve according to Statements 1-11, wherein the predetermined fluid pressure is less than the modulus of elasticity of the stem.

Statement 13: A poppet valve according to Statements 1-12, wherein the predetermined fluid pressure applies a force of at least 100 lbf.

Statement 14: A poppet valve according to Statements 1-13, wherein displacement of the stem from the first position to the second position elastically deforms the one or more collet fingers as the at least one protrusion displaces past the inward protruding lip.

Statement 15: A poppet valve according to Statements 1-14, wherein the elongated tubular housing is formed by an upper body, a middle body, and a lower body, the upper body receiving the biasing element, the middle body having the interior tubular member, and the lower body coupling the elastomeric seal.

Statement 16: A poppet valve according to Statements 1-15, wherein the elongated tubular housing is made of a material selected from the group consisting of brass, aluminum, steel, composite, and alloys thereof.

Statement 17: A poppet valve according to Statements 1-16, wherein the predetermined fluid pressure is selected to achieve an opening pressure of at least 50 psi.

Statement 18: A poppet valve according to Statements 1-17, wherein the predetermined fluid pressure is selected to achieve an opening pressure of at least 80 psi.

Statement 19: A poppet valve according to Statements 1-18, where in the inward protruding lip and the at least one protrusion each having opposing ramped surfaces.

Statement 20: A poppet valve according to Statements 1-19, wherein the first position is a sealed configuration.

Statement 21: A poppet valve according to Statements 1-20, wherein the second position is an open configuration.

Statement 22: A method of controlling fluid flow comprising providing a poppet valve comprising an elongated tubular housing having an internal bore extending along a longitudinal axis of the elongated tubular housing and having at least one flange extending into the internal bore, the at least one flange supporting an interior tubular member extending along a length of the longitudinal axis within the elongated tubular housing and having a central aperture, fluid communication being permitted through the internal bore between the elongated tubular housing and the interior tubular member, the interior tubular member having an inward protruding lip extending from an inner surface of the interior tubular member into the central aperture, a stem at least partially received in the central aperture of the interior tubular member, a middle portion of the stem having one or more collet fingers, the stem being slidably transitionable between a first position and a second position, at least one protrusion extending from the one or more collet fingers, the at least one protrusion engagable with the inward protruding lip, a biasing element disposed in the elongated tubular housing and engageable with the stem and biasing the stem toward the first position, and an elastomeric seal disposed at a first end of the stem, wherein when the stem is in the first position the at least one protrusion is engaged with the inward protruding lip and the elastomeric seal forms a substantially fluid tight seal within the elongated tubular housing preventing fluid flow through the internal bore, applying a first predetermined fluid pressure to a second end of the stem; compressing at least a portion of the biasing element; displacing the stem longitudinally within the elongated tubular housing, releasing the substantially fluid tight seal between the elongated tubular housing and the stem; decreasing the fluid pressure on the second end of the stem below a second predetermined fluid pressure; expanding the biasing element; and displacing the stem longitudinally within the elongated tubular housing and resealing the substantially fluid tight seal between the elongated tubular housing and the stem.

Statement 23: A method according to Statement 22, wherein the poppet valve further comprises an O-ring disposed around the first end of the stem and engaging an inner surface of the elongated tubular housing.

Statement 24: A method according to Statement 22 or Statement 23, wherein the at least one protrusion the one or more collet fingers has a first sloped surface and a second sloped surface, the first sloped surface having a first angle of inclination shallow enough to allow the biasing element to return the stem to the first position upon removal of fluid pressure and the second sloped surface having a second angle of inclination abutting the inward protruding lip of the elongated tubular housing.

Statement 25: A method according to Statements 22-24, wherein the first angle of inclination is from about zero degrees (0°) to about ninety degrees (90°) relative to the longitudinal axis, and the second angle of inclination is from about zero degrees (0°) to about ninety degrees (90°) relative to the longitudinal axis.

Statement 26: A method according to Statements 22-25, wherein the first angle of inclination is from about zero degrees (0°) to about forty-five degrees (45°) relative to the longitudinal axis, and the second angle of inclination is from about forty-five degrees (45°) to about ninety degrees (90°) relative to the longitudinal axis.

Statement 27: A method according to Statements 22-26, wherein the first angle of inclination and the second angle of inclination are not both zero degrees (0°).

Statement 28: A method according to Statements 22-27, wherein the first angle of inclination and the second angle of inclination are not both ninety degrees (90°).

Statement 29: A method according to Statements 22-28, wherein the first angle of inclination is at least five degrees (5°) relative to the longitudinal axis.

Statement 30: A method according to Statements 22-29, wherein the second angle of inclination is at least seventy five degrees (75°) relative to the longitudinal axis.

Statement 31: A method according to Statements 22-30, wherein the biasing element of the poppet valve exerts a force of at least 20 pounds on the interior tubular member, thus fluid pressure of at least 20 pounds holds the stem in the second position and fluid pressure less than 20 pounds transitions the stem from the second position to the first position.

Statement 32: A method according to Statements 22-31, wherein the biasing element is a coil spring.

Statement 33: A method according to Statements 22-32, wherein the first predetermined fluid pressure is less than the modulus of elasticity of the stem.

Statement 34: A method according to Statements 22-33, wherein the first predetermined fluid pressure applies a force of at least 100 lbf.

Statement 35: A method according to Statements 22-34, further comprising elastically deforming the one or more collet fingers as the at least one protrusion displaces past the inward protruding lip when the stem transitions from the first position to the second position.

Statement 36: A method according to Statements 22-35, wherein the elongated tubular housing of the poppet valve is formed by an upper body, a middle body, and a lower body, the upper body receiving the biasing element, the middle body having the interior tubular member, and the lower body coupling the elastomeric seal.

Statement 37: A method according to Statements 22-36, wherein the elongated tubular housing of the poppet valve is made of a material selected from the group consisting of brass, aluminum, steel, composite, and alloys thereof.

Statement 38: A method according to Statements 22-37, wherein the first predetermined fluid pressure is selected to achieve an opening pressure of at least 50 psi.

Statement 39: A method according to Statements 22-38, wherein the first predetermined fluid pressure is selected to achieve an opening pressure of at least 80 psi.

Statement 40: A method according to Statements 22-39, wherein the inward protruding lip and the at least one protrusion each having opposing ramped surfaces.

Statement 41: A method according to Statements 22-40, wherein the first position is a sealed configuration.

Statement 42: A method according to Statements 22-41, wherein the second position is an open configuration.

Statement 43: A system comprising a casing; and a poppet valve disposed within the casing, the poppet valve comprising an elongated tubular housing having an internal bore extending along a longitudinal axis of the elongated tubular housing and having at least one flange extending into the internal bore, the at least one flange supporting an interior tubular member extending along a length of the longitudinal axis within the elongated tubular housing and having a central aperture, fluid communication being permitted through the internal bore between the elongated tubular housing and the interior tubular member, the interior tubular member having an inward protruding lip extending from an inner surface of the interior tubular member into the central aperture; a stem at least partially received in the central aperture of the interior tubular member, a middle portion of the stem having one or more collet fingers, the stem being slidably transitionable between a first position and a second position; at least one protrusion extending from the one or more collet fingers, the at least one protrusion engagable with the inward protruding lip; a biasing element disposed in the elongated tubular housing and engageable with the stem and biasing the stem toward the first position; and an elastomeric seal disposed at a first end of the stem; wherein when the stem is in the first position the at least one protrusion is engaged with the inward protruding lip and the elastomeric seal forms a substantially fluid tight seal within the elongated tubular housing preventing fluid flow through the internal bore; wherein upon application of a predetermined fluid pressure through the elongated tubular housing, the stem transitions from the first position to the second position, overcoming the biasing force of the biasing element and being longitudinally displaced such that the at least one protrusion passes over the inward protruding lip, whereby fluid flow is permitted through the internal bore.

Statement 44: A system according to Statement 43, wherein the poppet valve further comprises an O-ring disposed around the first end of the first end of the stem and engaging an inner surface of the elongated tubular housing.

Statement 45: A system according to Statement 43 or Statement 44, wherein the at least one protrusion has a first sloped surface and a second sloped surface, the first sloped surface having a first angle of inclination shallow enough to allow the biasing element to return the stem to the first position upon removal of fluid pressure and the second sloped surface having a second angle of inclination abutting the inward protruding lip of the elongated tubular housing.

Statement 46: A system according to Statements 43-45, wherein the first angle of inclination is from about zero degrees (0) to about ninety degrees (90) relative to the longitudinal axis, and the second angle of inclination is from about zero degrees (0) to about ninety degrees (90) relative to the longitudinal axis.

Statement 47: A system according to Statements 43-46, wherein the first angle of inclination is from about zero degrees (0°) to about forty-five degrees (45°) relative to the longitudinal axis, and the second angle of inclination is from about forty-five degrees (45°) to about ninety degrees (90°) relative to the longitudinal axis.

Statement 48: A system according to Statements 43-47, wherein the first angle of inclination and the second angle of inclination are not both zero degrees (0°).

Statement 49: A system according to Statements 43-48, wherein the first angle of inclination and the second angle of inclination are not both ninety degrees (90°).

Statement 50: A system according to Statements 43-49, wherein the first angle of inclination is at least five degrees (5°) relative to the longitudinal axis.

Statement 51: A system according to Statements 43-50, wherein the second angle of inclination is at least seventy five degrees (75°) relative to the longitudinal axis.

Statement 52: A system according to Statements 43-51, wherein the biasing element of the poppet valve exerts a force of at least 20 pounds on the interior tubular member, thus fluid pressure of at least 20 pounds holds the stem in the second position and fluid pressure less than 20 pounds transitions the stem from the second position to the first position.

Statement 53: A system according to Statements 43-52, wherein the biasing element is a coil spring.

Statement 54: A system according to Statements 43-53, wherein the predetermined fluid pressure is less than the modulus of elasticity of the stem.

Statement 55: A system according to Statements 43-54, wherein the predetermined fluid pressure applies a force of at least 100 lbf.

Statement 56: A system according to Statements 43-55, wherein displacement of the stem from the first position to the second position elastically deforms the one or more collet fingers as the at least one protrusion displaces past the inward protruding lip.

Statement 57: A system according to Statements 43-56, wherein the elongated tubular housing of the poppet valve is formed by an upper body, a middle body, and a lower body, the upper body receiving the biasing element, the middle body having the interior tubular member, and the lower body coupling the elastomeric seal.

Statement 58: A system according to Statements 43-57, wherein the elongated tubular housing of the poppet valve is made of a material selected from the group consisting of brass, aluminum, steel, composite, and alloys thereof.

Statement 59: A system according to Statements 43-58, wherein the predetermined fluid pressure is selected to achieve an opening pressure of at least 50 psi.

Statement 60: A system according to Statements 43-59, wherein the predetermined fluid pressure is selected to achieve an opening pressure of at least 80 psi.

Statement 61: A system according to Statements 43-60, where in the inward protruding lip and the at least one protrusion each having opposing ramped surfaces.

Statement 62: A system according to Statements 43-61, wherein the first position is a sealed configuration.

Statement 63: A system according to Statements 43-62, wherein the second position is an open configuration.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A poppet valve comprising:
an elongated tubular housing having an internal bore extending along a longitudinal axis of the elongated tubular housing and having at least one flange extending into the internal bore, the at least one flange supporting an interior tubular member extending along a length of the longitudinal axis within the elongated tubular housing and having a central aperture, fluid communication being permitted through the internal bore between the elongated tubular housing and the interior tubular member, the interior tubular member having an inward protruding lip extending from an inner surface of the interior tubular member into the central aperture;
a stem at least partially received in the central aperture of the interior tubular member, the stem comprising an uphole end, a downhole end, and a middle portion extending therebetween having one or more collet fingers, the stem being slidably transitionable between a first position and a second position, the stem further comprising:
at least one protrusion extending from the one or more collet fingers, the at least one protrusion engagable with the inward protruding lip of the interior tubular member, wherein the at least one protrusion has a first sloped surface and a second sloped surface, the first sloped surface having a first angle of inclination—and the second sloped surface having a second angle of inclination abutting the inward protruding lip of the elongated tubular housing;
a biasing element disposed about the uphole end of the stem and engageable with the inner tubular member of the elongated tubular housing, the biasing element biasing the stem toward the first position via an expansive force; and
an elastomeric seal disposed around the downhole end of the stem;
wherein when the stem is in the first position the at least one protrusion on the one or more collet fingers is engaged with the inward protruding lip of the interior tubular member, and the elastomeric seal forms a substantially fluid tight seal at a downhole end of the elongated tubular housing preventing fluid flow through the internal bore,
wherein the second angle of inclination is such that a pressure of at least 50 psi is required for the at least one protrusion to slide over the second sloped surface, and the biasing element exerts a force of at least 20 pounds on the interior tubular member and the first angle of inclination is shallow enough to allow the biasing element to return the stem to the first position upon removal fluid pressure to a fluid pressure of less than 20 pounds, and
wherein upon application of a predetermined fluid pressure through the elongated tubular housing, the stem transitions from the first position to the second position, overcoming the biasing force of the biasing element and overcoming the force required for the at least one protrusion to slide over the second sloped surface and being longitudinally displaced such that the at least one protrusion on the one or more collet fingers passes over the inward protruding lip of the interior tubular member, allowing fluid flow through the internal bore and out the downhole end of the elongated tubular housing, and
wherein upon removal of the predetermined fluid pressure through the elongated tubular housing, the one or more collet fingers and the biasing element return the stem to the first position.

2. The poppet valve of claim 1, wherein the second angle of inclination is such that a pressure of 80 psi to 120 psi and a fluid pressure of 200 lbf to 2000 lbf is required for the at least one protrusion to slide over the second sloped surface.

3. The poppet valve of claim 2, wherein the first angle of inclination is from about zero degrees (0°) to about ninety degrees (90°) relative to the longitudinal axis, and the second angle of inclination is from about zero degrees (0°) to about ninety degrees (90°) relative to the longitudinal axis.

4. The poppet valve of claim 1, wherein the biasing element exerts a force of at least 20 pounds on the interior tubular member.

5. The poppet valve of claim 1, wherein the predetermined fluid pressure applies a force of at least 100 lbf.

6. The poppet valve of claim 1, wherein the predetermined fluid pressure is selected to achieve an opening pressure of at least 50 psi.

7. The poppet valve of claim 1, where in the inward protruding lip and the at least one protrusion each having opposing ramped surfaces.

8. A casing comprising the poppet valve of claim 1.

9. A method of controlling fluid flow comprising:
providing a poppet valve comprising:

an elongated tubular housing having an internal bore extending along a longitudinal axis of the elongated tubular housing and having at least one flange extending into the internal bore, the at least one flange supporting an interior tubular member extending along a length of the longitudinal axis within the elongated tubular housing and having a central aperture, fluid communication being permitted through the internal bore between the elongated tubular housing and the interior tubular member, the interior tubular member having an inward protruding lip extending from an inner surface of the interior tubular member into the central aperture, a stem at least partially received in the central aperture of the interior tubular member, the stem comprising an uphole end, a downhole end, and a middle portion extending therebetween having one or more collet fingers, the stem being slidably transitionable between a first position and a second position, the stem further comprising:

at least one protrusion extending from the one or more collet fingers, the at least one protrusion engagable with the inward protruding lip of the interior tubular member, wherein the at least one protrusion has a first sloped surface and a second sloped surface, the first sloped surface having a first angle of inclination and the second sloped surface having a second angle of inclination abutting the inward protruding lip of the elongated tubular housing, a biasing element disposed about the uphole end of the stem and engageable with the inner tubular member of the elongated tubular housing, the biasing element biasing the stem toward the first position via an expansive force, and an elastomeric seal disposed at the downhole end of the stem, wherein when the stem is in the first position the at least one protrusion on the one or more collet fingers is engaged with the inward protruding lip of the interior tubular member, and the elastomeric seal forms a substantially fluid tight seal at a downhole end of the elongated tubular housing preventing fluid flow through the internal bore, wherein the second angle of inclination is such that a pressure of at least 50 psi is required for the at least one protrusion to slide over the second sloped surface, and the biasing element exerts a force of at least 20 pounds on the interior tubular member and the first angle of inclination is shallow enough to allow the biasing element to return the stem to the first position upon removal fluid pressure to a fluid pressure of less than 20 pounds;

applying a first predetermined fluid pressure to the uphole end of the stem, wherein the first predetermined fluid pressure is sufficient to overcome the force required for the at least one protrusion to slide over the second sloped surface and compress at least a portion of the biasing element and the stem is longitudinally displaced within the elongated tubular housing as the one or more collet fingers passes over the inward protruding lip of the interior tubular member, releasing the substantially fluid tight seal between the elongated tubular housing and the stem; and decreasing the fluid pressure on the uphole end of the stem until the fluid pressure is below a second predetermined fluid pressure, wherein the second predetermined pressure allows the biasing element to expand, and the one or more collet fingers return the stem to the first position and reseal the substantially fluid tight seal between the elongated tubular housing and the stem.

10. The method of claim 9, wherein the second angle of inclination is such that a pressure of 80 psi to 120 psi and a fluid pressure of 200 lbf to 2000 lbf is required for the at least one protrusion to slide over the second sloped surface.

11. The method of claim 10, wherein the first angle of inclination is from about zero degrees (0°) to about ninety degrees (90°) relative to the longitudinal axis, and the second angle of inclination is from about zero degrees (0°) to about ninety degrees (90°) relative to the longitudinal axis.

12. The method of claim 9, wherein the biasing element of the poppet valve exerts a force of at least 20 pounds on the interior tubular member.

13. The method of claim 9, wherein the first predetermined fluid pressure applies a force of at least 100 lbf.

14. The method of claim 9, further comprising elastically deforming the one or more collet fingers as the at least one protrusion displaces past the inward protruding lip when the stem transitions from the first position to the second position.

15. The method of claim 9, wherein the first predetermined fluid pressure is selected to achieve an opening pressure of at least 50 psi.

16. The method of claim 9, wherein the poppet valve is disposed at a downhole end of a casing.

17. A system comprising:

a casing; and a poppet valve disposed within the casing, the poppet valve comprising:

an elongated tubular housing having an internal bore extending along a longitudinal axis of the elongated tubular housing and having at least one flange extending into the internal bore, the at least one flange supporting an interior tubular member extending along a length of the longitudinal axis within the elongated tubular housing and having a central aperture, fluid communication being permitted through the internal bore between the elongated tubular housing and the interior tubular member, the interior tubular member having an inward protruding lip extending from an inner surface of the interior tubular member into the central aperture;

a stem at least partially received in the central aperture of the interior tubular member, the stem comprising an uphole end, a downhole end, and a middle portion extending therebetween having one or more collet fingers, the stem being slidably transitionable between a first position and a second position, the stem further comprising:

at least one protrusion extending from the one or more collet fingers, the at least one protrusion engagable with the inward protruding lip of the interior tubular member, wherein the at least one protrusion has a first sloped surface and a second sloped surface, the first sloped surface having a first angle of inclination and the second sloped surface having a second angle of inclination abutting the inward protruding lip of the elongated tubular housing;

a biasing element disposed about the uphole end of the stem and engageable with the inner tubular member of the elongated tubular housing, the biasing element biasing the stem toward the first position via an expansive force; and an elastomeric seal disposed at the downhole end of the stem;

wherein when the stem is in the first position the at least one protrusion on the one or more collet fingers is engaged with the inward protruding lip of the interior tubular member, and the elastomeric seal forms a substantially fluid tight seal at a downhole end of the elongated tubular housing preventing fluid flow through the internal bore, wherein the second angle of inclination is such that a pressure of at least 50 psi is required for the at least one protrusion to slide over the second sloped surface, and the biasing element exerts a force of at least 20 pounds on the interior tubular member and the first angle of inclination is shallow enough to allow the biasing element to return the stem to the first position upon removal fluid pressure to a fluid pressure of less than 20 pounds; and wherein upon application of a predetermined fluid pressure through the elongated tubular housing, the stem transitions from the first position to the second position, overcoming the biasing force of the biasing element overcoming the force required for the at least one protrusion to slide over the second sloped surface and being longitudinally displaced such that the at least one protrusion on the one or more collet fingers passes over the inward protruding lip of the interior tubular member, allowing fluid flow through the internal bore and out the downhole end of the elongated tubular housing, and wherein upon removal of the predetermined fluid pressure through the elongated tubular housing, the one or more collet fingers and the biasing element return the stem to the first position.

18. The system of claim 17, wherein the second angle of inclination is such that a pressure of 80 psi to 120 psi and a fluid pressure of 200 lbf to 2000 lbf is required for the at least one protrusion to slide over the second sloped surface.

19. The system of claim 18, wherein the first angle of inclination is from about zero degrees (0°) to about ninety degrees (90°) relative to the longitudinal axis, and the second angle of inclination is from about zero degrees (0°) to about ninety degrees (90°) relative to the longitudinal axis.

20. The system of claim 17, wherein displacement of the stem from the first position to the second position elastically deforms the one or more collet fingers as the at least one protrusion displaces past the inward protruding lip.

21. The system of claim 17, wherein the predetermined fluid pressure is selected to achieve an opening pressure of at least 50 psi.

22. The system of claim 17, where in the inward protruding lip and the at least one protrusion each having opposing ramped surfaces.

* * * * *